(12) United States Patent
Vasseur et al.

(10) Patent No.: US 9,176,832 B2
(45) Date of Patent: Nov. 3, 2015

(54) PROVIDING A BACKUP NETWORK TOPOLOGY WITHOUT SERVICE DISRUPTION

(71) Applicant: Cisco Technology, Inc., San Jose, CA (US)

(72) Inventors: Jean-Philippe Vasseur, Saint Martin d'Uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 245 days.

(21) Appl. No.: 13/839,053

(22) Filed: Mar. 15, 2013

(65) Prior Publication Data

US 2014/0281670 A1    Sep. 18, 2014

(51) Int. Cl.

| | |
|---|---|
| *G06F 11/00* | (2006.01) |
| *G06F 11/20* | (2006.01) |
| *H04W 40/24* | (2009.01) |
| *H04W 40/30* | (2009.01) |
| *H04L 12/751* | (2013.01) |
| *H04L 12/715* | (2013.01) |
| *H04L 12/707* | (2013.01) |
| *H04L 12/703* | (2013.01) |
| *H04L 12/753* | (2013.01) |

(Continued)

(52) U.S. Cl.
CPC ............ *G06F 11/2002* (2013.01); *H04L 45/02* (2013.01); *H04L 45/04* (2013.01); *H04L 45/14* (2013.01); *H04L 45/22* (2013.01); *H04L 45/28* (2013.01); *H04L 45/48* (2013.01); *H04W 40/24* (2013.01); *H04W 40/30* (2013.01); *H04W 84/18* (2013.01)

(58) Field of Classification Search
CPC ..... G06F 11/2002; H04L 45/02; H04L 45/04; H04L 45/14; H04L 45/22; H04L 45/28; H04L 45/48; H04W 40/24; H04W 40/30; H04W 84/18
USPC ........................................................ 714/4.11
See application file for complete search history.

(56) References Cited

U.S. PATENT DOCUMENTS

| | | | |
|---|---|---|---|
| 6,148,410 A | | 11/2000 | Baskey et al. |
| 7,876,706 B2 | * | 1/2011 | Ekl et al. ........................ 370/254 |
| 8,363,666 B2 | | 1/2013 | Donthamsetty et al. |

(Continued)

OTHER PUBLICATIONS

Wang, et al., "A Dependable Clustering Protocol for Survivable Underwater Sensor Networks", IEEE Conference on Communications, May 2008, pp. 3263-3268, IEEE, Beijing, China.*

(Continued)

*Primary Examiner* — Bryce Bonzo
*Assistant Examiner* — Anthony J Amoroso
(74) *Attorney, Agent, or Firm* — Parker Ibrahim & Berg LLC; James M. Behmke; Stephen D. LeBarron

(57) ABSTRACT

In one embodiment, a primary root node may detect one or more neighboring root nodes based on information received from a first-hop node and may select a backup root node among the neighboring root nodes. Once selected, the backup root node may send the primary root node a networking identification and a corresponding group mesh key which the primary root node may forward to the first-hop nodes to cause the first-hop nodes to migrate to the backup root node when connectivity to the primary root node fails. In addition, the first-hop root nodes may migrate back to the primary root node when connectivity to the primary root node is restored.

20 Claims, 10 Drawing Sheets

(51) Int. Cl.
*H04L 12/721* (2013.01)
*H04W 84/18* (2009.01)

(56) References Cited

U.S. PATENT DOCUMENTS

| | | | |
|---|---|---|---|
| 8,369,880 B2* | 2/2013 | Citrano et al. | 455/507 |
| 2011/0069609 A1* | 3/2011 | Le Roux et al. | 370/221 |
| 2012/0307825 A1 | 12/2012 | Hui et al. | |
| 2012/0320790 A1 | 12/2012 | Shaffer et al. | |

OTHER PUBLICATIONS

Cao, et al., "Head Node Protection Extensions to RSVP-TE for LSP Tunnels", Network Working Group, Internet Draft, draft-cao-mpls-to-p2mp-head-protection-01.txt, Nov. 2007, 17 pages, The Internet Engineering Task Force Trust.

Chaitou, et al., "Multi-Point to Multi-Point Traffic Engineering", IEEE Symposium on Computers and Communications, Jul. 2008, pp. 1047-1055, IEEE, Piscataway, NJ.

Lafitte-De Jong, et al., "Notification of Transmittal of the International Search Report and the Written Opinion of the International Searching Authority, or the Declaration", Patent Cooperation Treaty, International Application No. PCT/US2014/019813, mailed May 22, 2014, 12 pages, European Patent Office, Rijswijk, Netherlands.

Park, et al., "Information Communication Mechanism for Loosely Coupled Mobile User Groups in Wireless Sensor Fields", International Conference on Advanced Information Networking and Applications, May 2009, pp. 572-579, IEEE, Piscataway, NJ.

Gnawali, et al., "The Minimum Rank with Hysteresis Objective Function", Request for Comments 6719, Sep. 2012, 13 pages, Internet Engineering Task Force Trust.

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Routing Metrics Used for Path Calculation in Low-Power and Lossy Networks", Request for Comments 6551, Mar. 2012, 30 pages, Internet Engineering Task Force Trust.

Winter; et al., "RPL: IPv6 Routing Protocol for Low-Power and Lossy Networks", Internet Engineering Task Force, Request for Comments 6550, Mar. 2012, 157 pages.

* cited by examiner

PROVIDING A BACKUP NETWORK TOPOLOGY WITHOUT SERVICE DISRUPTION

TECHNICAL FIELD

The present disclosure relates generally to computer networks, and, more particularly, to providing a backup network topology without service disruption.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Furthermore, the traffic routing on the DAG is often directed to (or from) a Field is Area Router (FAR) in the LLN, where the FAR in turn may direct the traffic over a backhaul link, e.g., to a management system. When a FAR experiences a connectivity failure, for example, due to a planned maintenance or a malfunction, disruption occurs in the routing topology, and rebuilding of the LLN topology may be time consuming. In particular, the rebuilding process rebuilds all the states that were previously stored in the FAR prior to the connectivity failure (e.g., useful information about the characteristics of its network), causing further delay in restoring connectivity.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
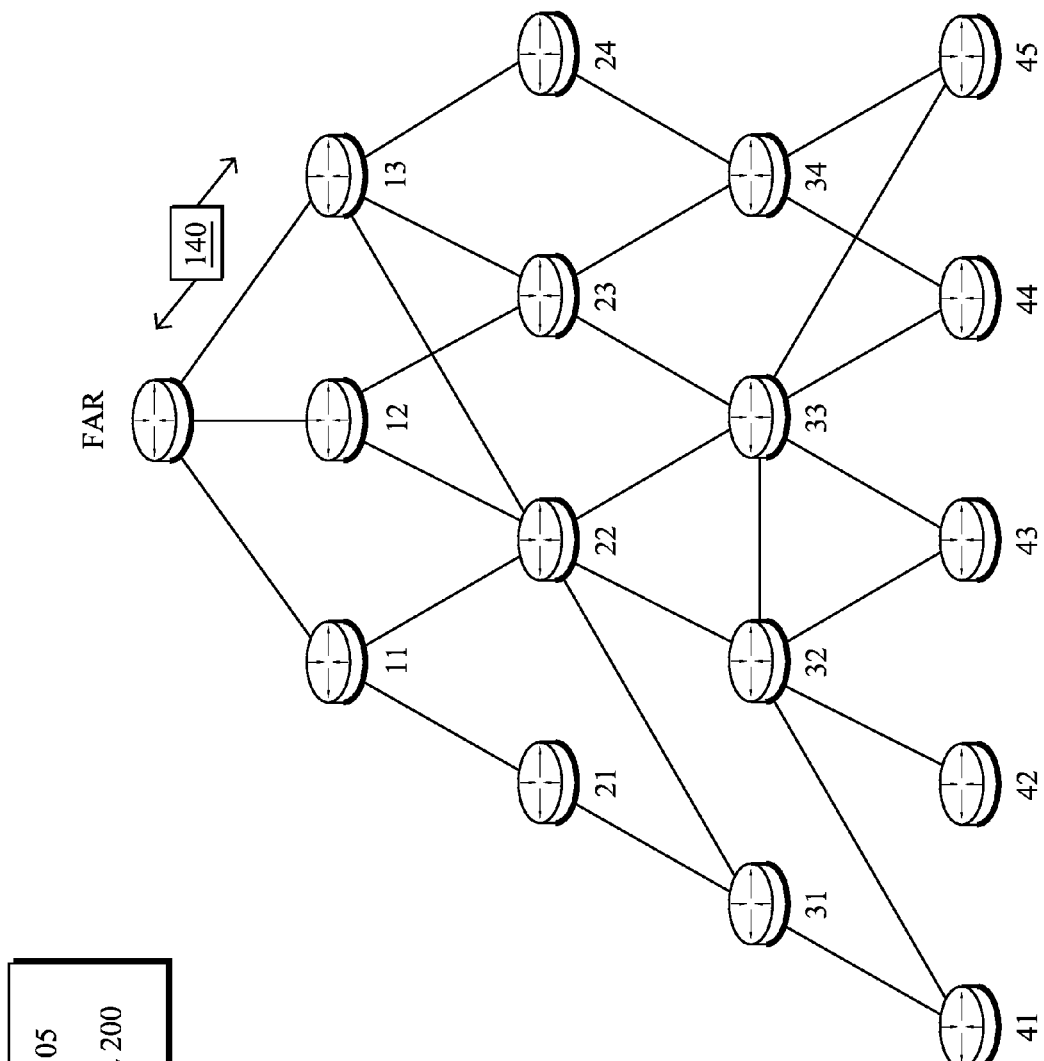
FIG. 1 illustrates an example communication network.

According to one or more embodiments of the disclosure, a primary root node in a shared-media communication network may detect one or more neighboring root nodes based on information received from first-hop nodes. In response to detecting the neighboring root nodes, the primary root node may select a backup root node and may receive a networking identification and a corresponding mesh group key from the backup root node. The primary root node may then notify the first-hop nodes of the backup root node along with the networking identification and the corresponding mesh group key to cause the first-hop nodes to migrate to the backup root node when connectivity to the primary root node fails.

According to one or more additional embodiments of the disclosure, a first-hop node in a shared-media communication network may send information to a primary root node identifying one or more neighboring root nodes. After sending the information to the primary root node, the first-hop node may receive a message from the primary root node indicating a backup root node along with a network identification and a corresponding mesh group key associated with the backup root node. The first-hop node may determine a connectivity failure to the primary root node and in response, may migrate to the backup root node.

DESCRIPTION

A computer network is a geographically distributed collection of nodes is interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 is illustratively comprising nodes/devices 200 (e.g., labeled as shown, "FAR" (root node), "11," "12," ... "45," and described in FIG. 2 below) interconnected by various methods of communication. For instance, the links 105 may be wired links or shared-media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node (field area router, FAR), the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
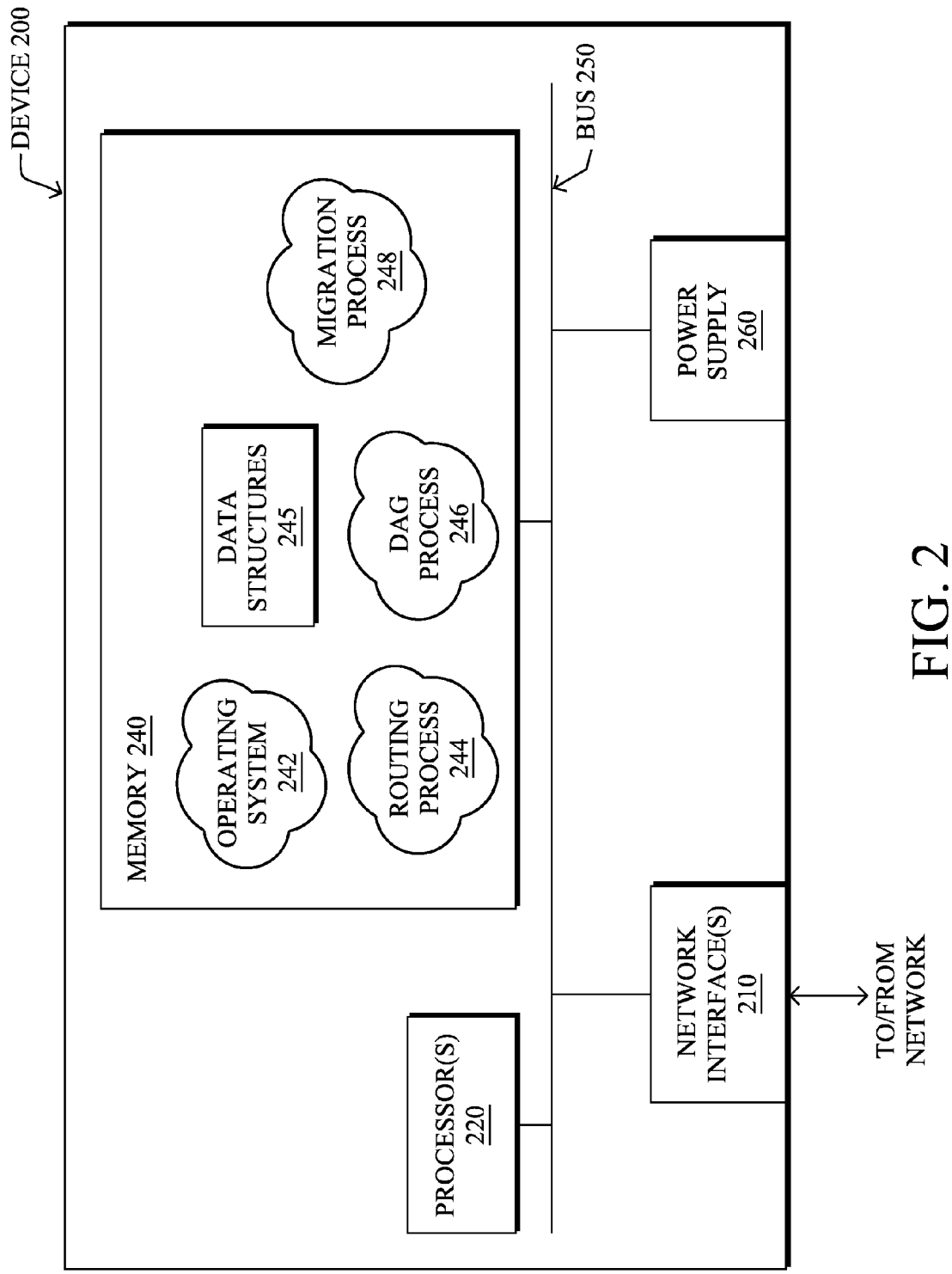
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate is through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative migration process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), Dynamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a is mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing is protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis"<RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" is may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO)

is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
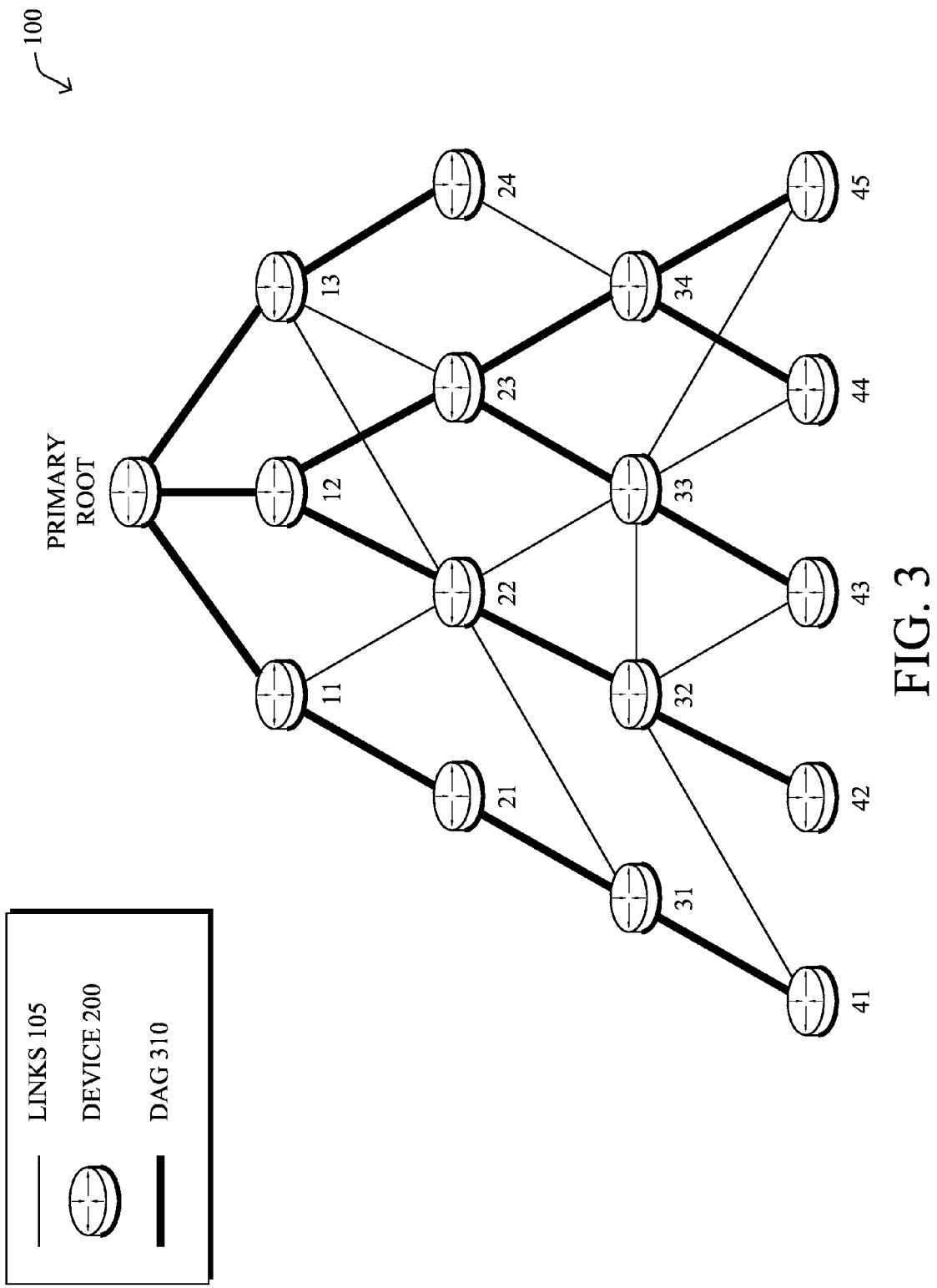
FIG. 3 illustrates an example routing topology (e.g., a directed acyclic graph or "DAG") in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf (or host) nodes via routing nodes.

As noted above, traffic in a shared-media communication network is generally routed to/from a FAR, which stores information regarding the states in the network. When the FAR experiences a connectivity failure, the stored information may be lost, and thus, when connectivity is restored, the stored information must be re-gathered. Certain stateful methods have been proposed, but such methods require storage and communication of significant amounts of state.

Dynamically Selecting a Backup Root Node

The techniques herein provide a method for providing a backup root node to manage when a single point of failure occurs at a primary root node. For instance, the primary root node may determine a plurality of backup root nodes based on information received from one or more "first-hop" nodes in the network (i.e., nodes one hop away from the primary root node), and may consider performance metrics when selecting a backup root node by using a set of algorithms. When a first-hop node detects a connectivity failure due to a link or a primary root node failure, the first-hop nodes may migrate to the selected backup root node without the LLN losing the stored states and information gathered over time.

Specifically, according to one or more embodiments of the disclosure as described in detail below, a primary root node may detect one or more neighboring root nodes based on information received from a first-hop node and may select a backup root node among the neighboring root nodes based on the received information. Once selected, the backup root node may send the primary root node a networking identification and a corresponding group mesh key which the primary root node may forward to the first-hop nodes to cause the first-hop nodes to migrate to the backup root node when connectivity to the primary root node fails. In addition, the first-hop root nodes may migrate back to the primary root node when connectivity to the primary root node is restored.

Illustratively, the techniques described herein may be performed by hardware, software, and/or firmware, in accordance with the illustrative migration process 248, which may contain computer executable instructions executed by the processor 220 (or independent processor of interfaces 210) to perform functions relating to the techniques described herein, e.g., in conjunction with (or as an integrated part of) routing process 244 and/or DAG process 246. For example, the techniques herein may be treated as extensions to conventional protocols, such as the various routing protocols (e.g., RPL), and as such, may be processed by similar components understood in the art that execute those protocols, accordingly.

Operationally, the techniques generally relate to primary root nodes dynamically selecting backup root nodes to prevent loss of state information during operational downtime or malfunction of the primary root nodes. In addition, the primary root nodes may restore the state information when connectivity is restored. In particular, as described further below, when a primary root node selects a backup root node, the first-hop nodes may migrate to the backup root node when connectivity to the primary root node fails, while maintaining a state of a subordinate network which operates without knowledge of the state of the primary root node.

Figure 4:
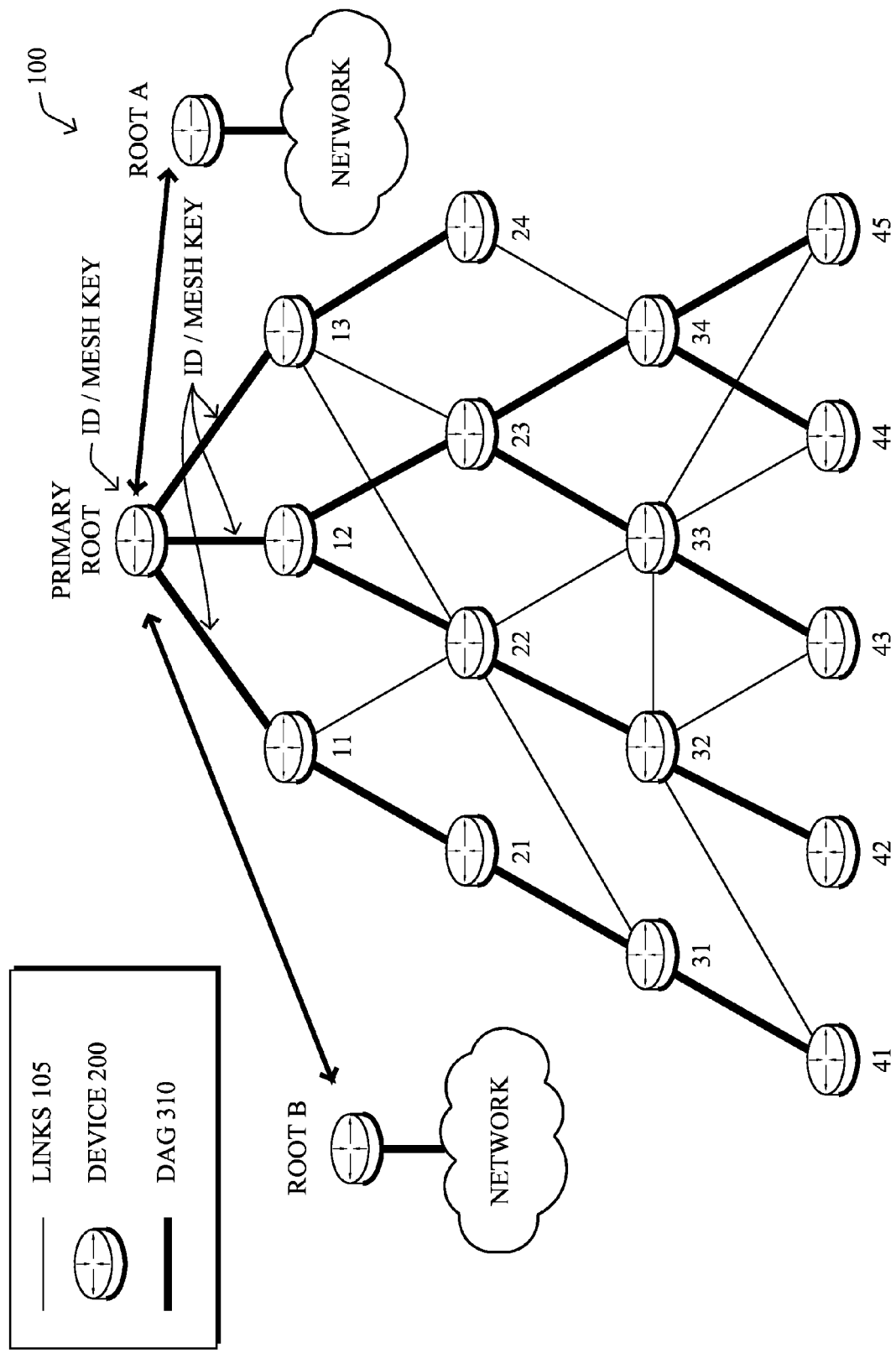
FIG. 4 illustrates an example view of a primary root node in a shared-media communication network detecting neighboring root nodes and receiving a networking identification and a corresponding group mesh key from a selected backup root node.

FIG. 4 illustrates an example view of a primary root node in a shared-media communication network along with neighboring root nodes. As shown in FIG. 4, the primary root node may detect one or more neighboring root nodes (e.g., root A and root B), such as based on information received from the first-hop nodes (e.g., 11 . . . 12 . . . 13), or from a management node (e.g., a network management server or "NMS") or else by its own discovery. In general, a node may join a particular network based on routing metrics and/or constraints to the root node, and after the node has joined the network, the node may share information about other neighboring networks with the primary root node (e.g., in the form of alternative options available to the first-hop nodes, and optionally the corresponding metrics to reach those alternative options).

In one embodiment, the primary root node may select a backup root node by receiving a notification from the first-hop nodes of potential backup root nodes and then selecting the backup root node based on the potential backup root node received from the most first-hop nodes. Specifically, a primary root node may have "n" direct children (e.g., first-hop nodes) and may determine a list "L" of those direct children which share information of potential backup root nodes. Furthermore, the primary root node may then select the backup root node with the greatest number of children having selected the backup root node, max |L| (e.g., the amount of children selecting the backup root node when a failure occurs). Alternatively, the primary root node may determine a total path cost associated with the neighboring root nodes and may select the backup root node based on the determined total path costs. Additionally, when the primary root node detects multiple similar backup root nodes (e.g., similar total path costs or selected by similar number or direct children), the primary root node may send a message to the neighboring root nodes to determine resource availability. Thereafter, the primary root node may select the backup root node based on resource availability.

Once the primary root node has selected a backup root node (or nodes), such as root A, the primary root node may send a message to the selected backup root node(s) with an instruction to operate as a backup root node. Alternatively, the primary root node may notify a network management system (e.g., the NMS) of a selected backup root node and the network management system may send a message to the backup root node with an instruction to operate as a backup root node. (Note that the message may also include other information, such as states of interest, e.g., a computed a traffic matrix, stored is information coming from a devices/sensors/etc.) In response, the primary root node may then receive an acknowledgment message from the backup root node including a network identification (ID) and a corresponding group mesh key, as also shown in FIG. 4.

In response to receiving the networking identification and corresponding group mesh key, the primary root node may notify the first-hop nodes of the selected backup root node along with the network identification and the corresponding group mesh key associated with the backup root node. In particular, the notification to the first-hop nodes may cause the first-hop nodes to create states that will be used to migrate to the backup root node when (if) communication failure to the primary root node occurs. Notably, the primary root node may notify the first-hop nodes of the selected backup root node along with the network identification and corresponding group mesh key via the network management system. Illustratively, the notification may include a type length value (TLV) called a "backup exist" (BE), which includes the address of the backup root node, the network ID, and group mesh key, as well as optionally the number "B" (e.g., when B<n) of first-hop children.

Figure 5A:
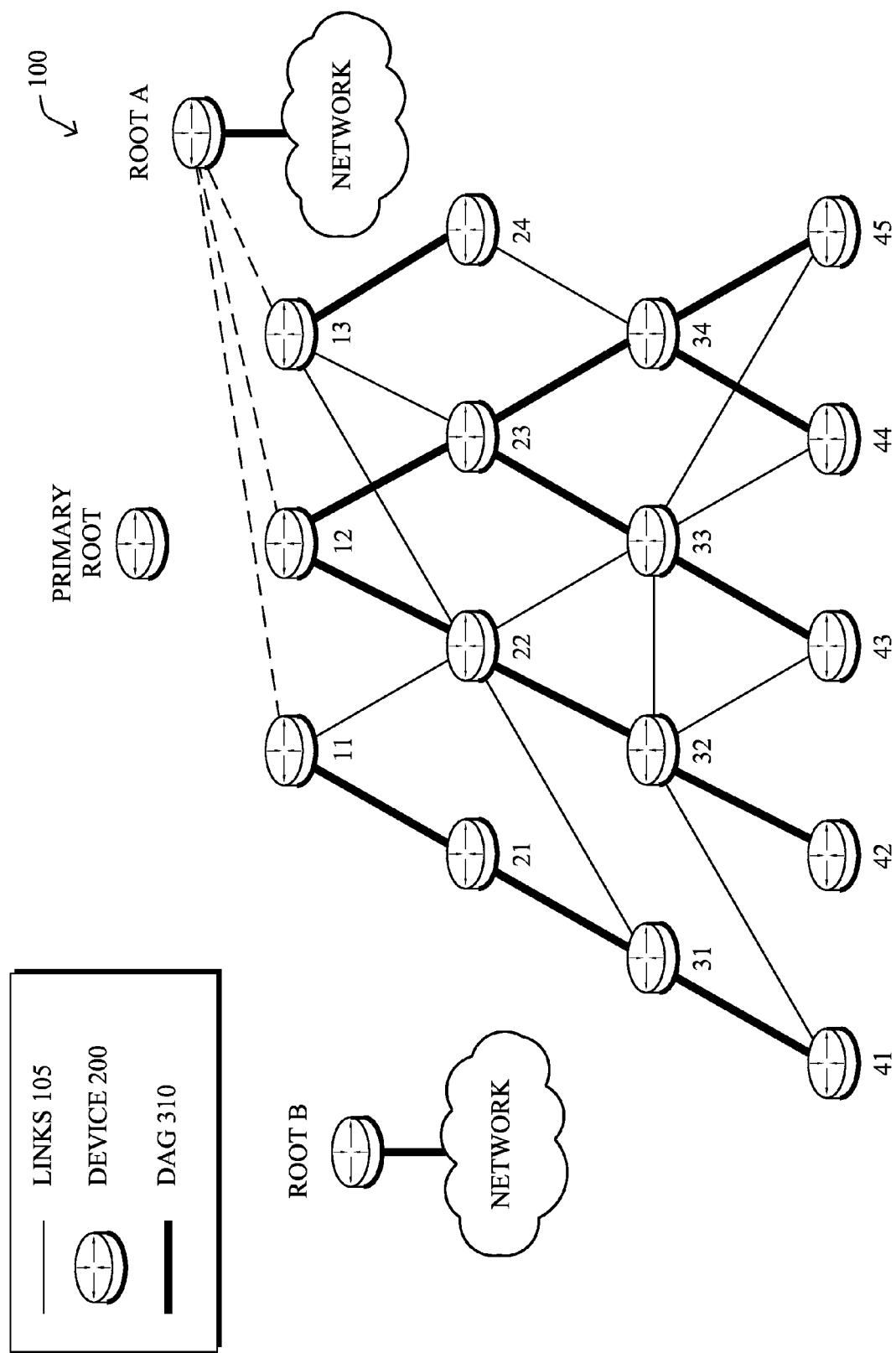
FIGS. 5A-5C illustrate example views of first-hop nodes migrating to a backup root node after connectivity failure to the primary root node.
Figure 5B:
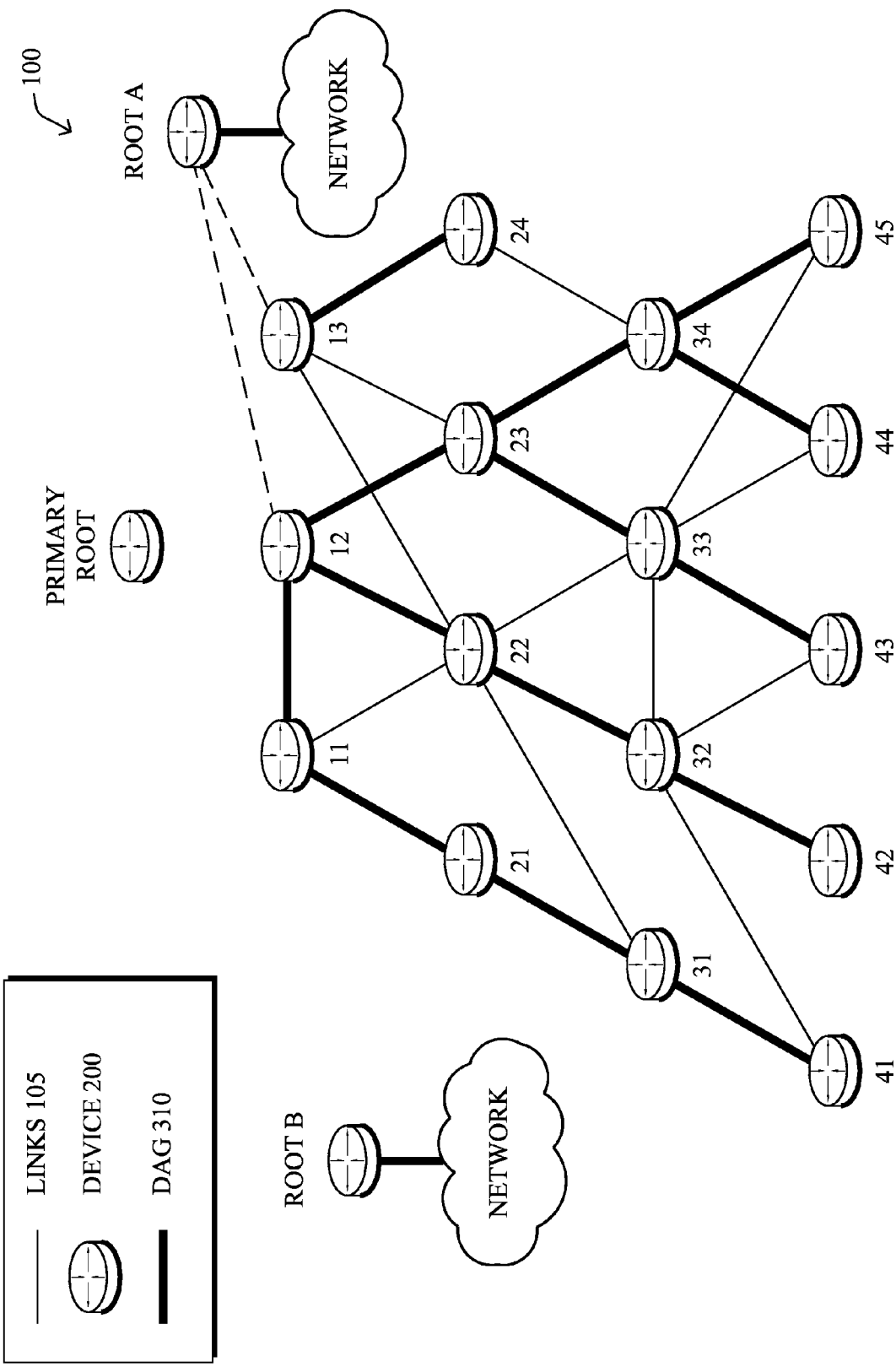
Figure 5C:
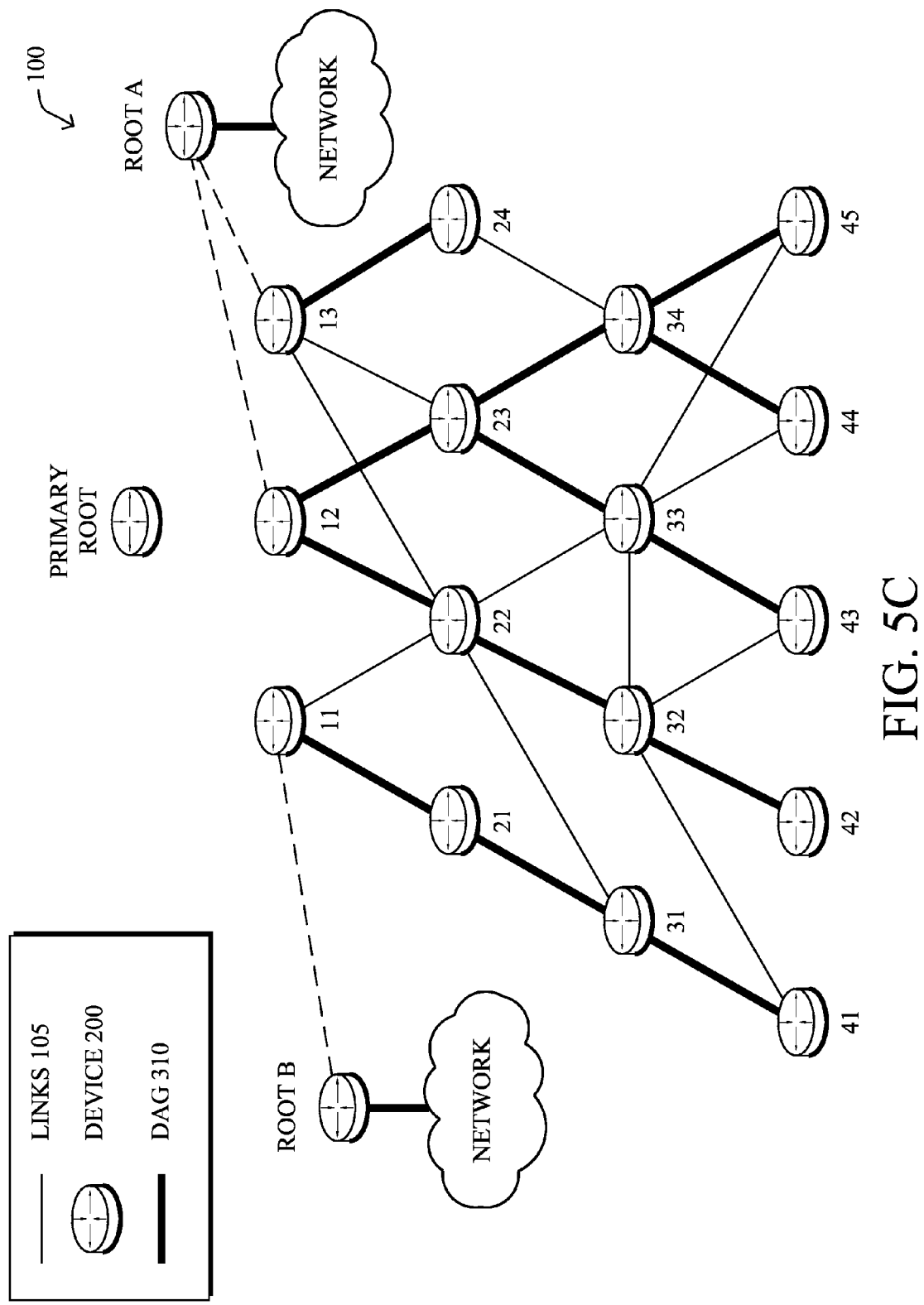

FIGS. 5A-5C illustrate example views of first-hop nodes migrating to a backup root node after connectivity failure to the primary root node. Specifically, a first-hop node in the shared-media communication network may detect the connectivity failure to the primary root node. In one embodiment, to determine (confirm) a connectivity failure, the first-hop node may first detect a lack of direct communication to the primary root, but may send a message to one or more neighboring nodes (e.g., other first-hop nodes) to test connectivity to the primary root node. The first-hop node may then detect a communication failure to the primary root node by confirming the communication failure from the neighboring nodes. In other words, to determine whether the connectivity failure to the primary root node is due to a link or a primary root node failure, the first-hop node may send a "TRY" message to the nodes in the shared-media communication network. The TRY message may request the other B nodes to check connectivity to the primary root node. Additionally, when the TRY message is sent, the first-hop node may set a timer and may make a determination of communication failure when the timer has expired. Furthermore, the first-hop node may determine a communication failure when the nodes send a message to the first-hop node indicating B or less received TRY messages.

When connectivity to the primary root node is detected, as shown in FIGS. 5A-5C, migration to a corresponding backup root node may occur. Specifically, the first-hop nodes may migrate to the selected backup root node using the network identification and the corresponding group mesh key associated with the backup root node.

In one embodiment, illustrated in FIG. 5A, the first-hop nodes may all migrate to a selected backup root node (root A) while maintaining a state of a subordinate network (e.g., routing state, traffic matrix, dynamics, etc.) and without requiring re-authentication or dynamic host configuration protocol (DHCP) servicing, thus ensuring similar rank of the first-hop nodes in the backup root network. Therefore, the migration does not require the entire network tree to migrate to the backup root node. In other words, the first-hop nodes may use the backup root node as a parent node while the subordinate nodes maintain the same parent selection without knowledge of the state of the primary root node (that is, they still use the same network ID and mesh key to communicate up to the first-hop nodes 11-13, while nodes 11-13 convert the communication to the network ID and mesh key of the backup root node). Thus, the entire topology tree does not require rebuilding due to the migration to the backup root node. In addition, the backup root node may accept the migration of the first-hop node to its network since the backup root node previously shared an associated network identification and group mesh key with the primary root node.

In another embodiment, illustrated in FIG. 5B, a first-hop node (e.g., node 11) may decide to use the selected backup root node (root A), but may reach the selected backup root node via another first-hop node (e.g., 12). Thus, the first-hop node 11 must forward messages to the other first-hop node 12 to reach the selected backup root node.

In this manner, the first-hop node 11 lowers in rank (for the backup connectivity state) and must forward messages to the next first-hop node 12 to reach the backup root node selected by the primary root node. In still another example embodiment, illustrated in FIG. 5C, a first-hop node 11 may maintain its own alternate backup root node (root B) is when the migration to the selected backup root node (root A) occurs (e.g., with individualized network ID and mesh key coordination from the primary root node). A node may select its own backup root node in response to various factors, including, but not limited to, metrics, constraints, reachability (e.g., perhaps node 11 is unable to see root A), etc. At the same time, a forced configuration may require the use of the selected backup root node (e.g., root A), and at which time, node 11 may communicate with root A via another first-hop node as mentioned in FIG. 5B above.

Figure 6:
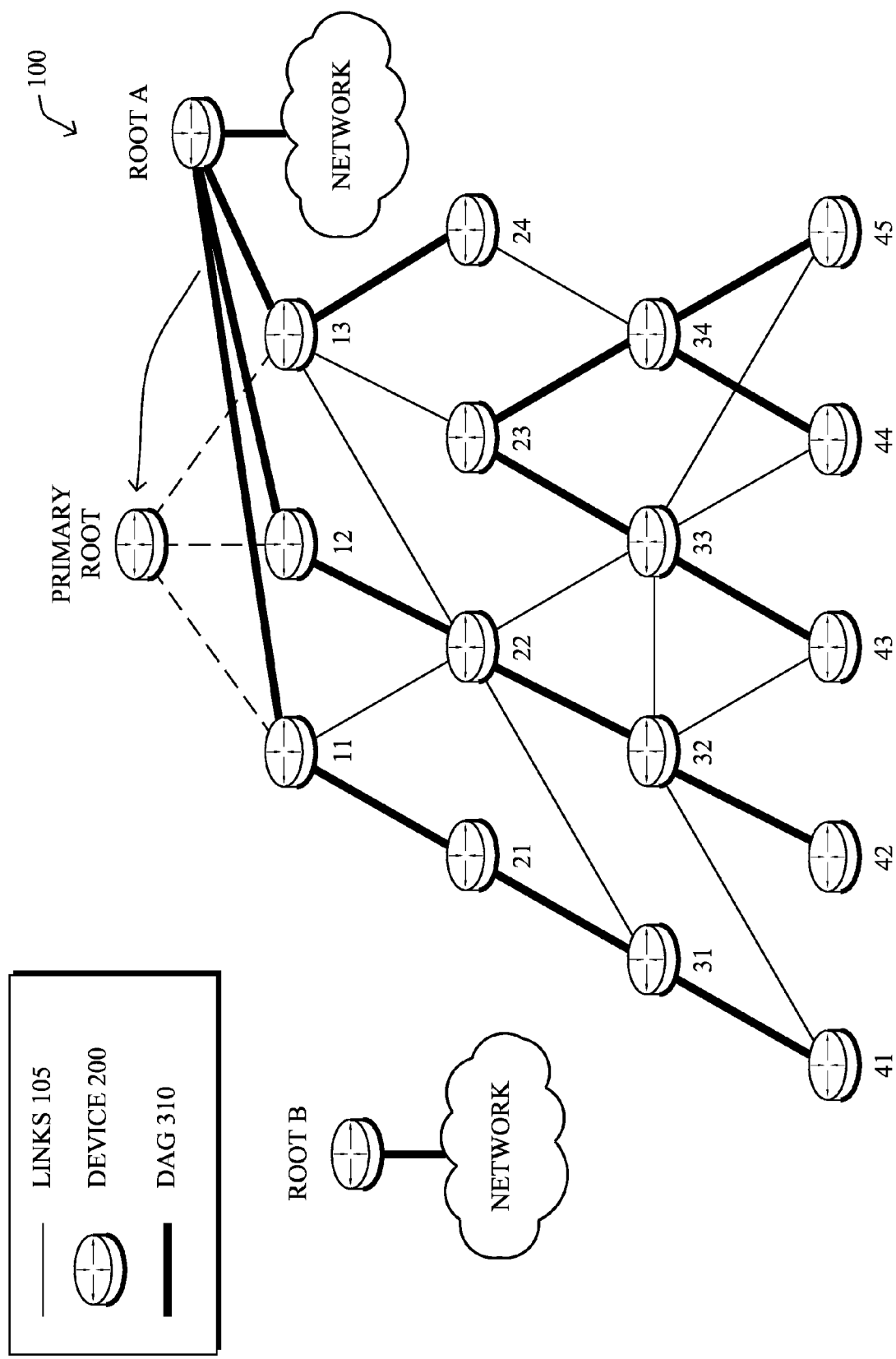
FIG. 6 illustrates an example view of first-hop nodes migrating back to the primary root node in response to restored connectivity to the primary root node.

Furthermore, the first-hop nodes may migrate back to the primary root node once connectivity to the primary root node is restored, as illustrated in FIG. 6. In addition, when migration back to the primary root node occurs, states of the subordinate network do not need to be rebuilt since only the first-hop nodes migrated to the backup root node. In particular, the first-hop root nodes may receive a message from the primary root node indicating restored connectivity to the primary root node and in response, the first-hop nodes may migrate back to the primary root node. Alternatively, the first-hop nodes may receive a selection metric regarding the backup root node, causing the migration back to the primary root node. For example, when the primary root node detects restored connectivity, it may send a DIO message, recognized by the first-hop nodes, which may cause the first-hop nodes to migrate back to the primary root node.

Alternatively, when the primary root node determines restored connectivity to the primary root node, it may notify the network management system of the restored connectivity. In response, the network management system may notify the backup root node of the restored connectivity to the primary root node and the backup root node may advertise a high expected transmission count and push the first-hop nodes to migrate back to the primary root node.

Figure 7:
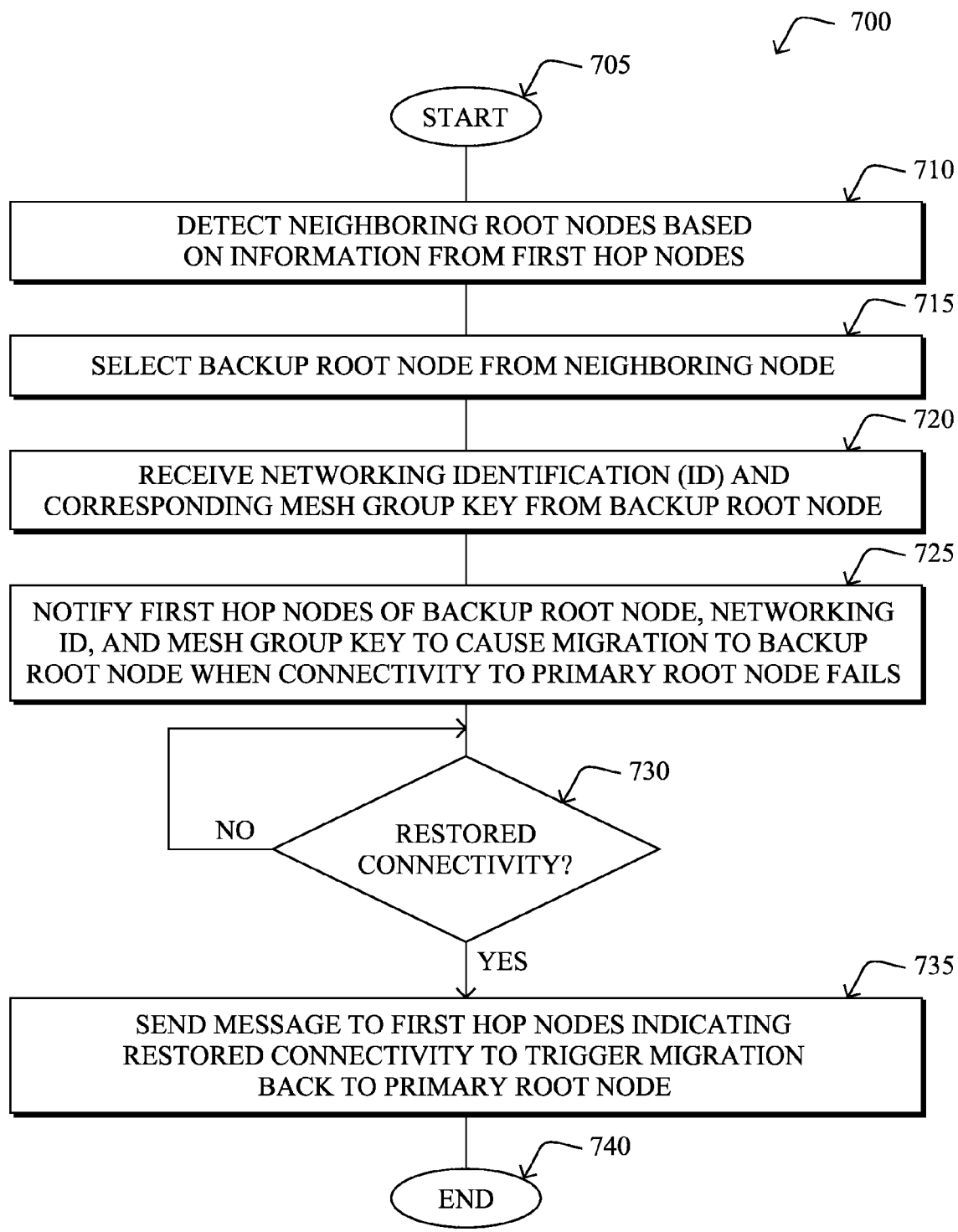
FIG. 7 illustrates an example simplified procedure for selecting a backup root node and causing migration to the backup root node.

FIG. 7 illustrates an example simplified procedure 700 for selecting a backup root node and causing migration to the backup root node in accordance with one or more embodiments described herein. The procedure 700 may start at step 705, and continues to step 710, where, as described in greater detail above, a primary root node may detect one or more neighboring root nodes based on information received from first-hop nodes in a shared-media communication network. As shown in step 715, the primary root node is may then select a backup root node from the neighboring root nodes. Furthermore, in step 720, the primary root node may receive network identification and a corresponding mesh group key from the backup root node as described above. In response to receiving the network identification and the corresponding mesh group key, the primary root node in step 725 may notify the first-hop nodes of the backup root node along with the network identification and the corresponding mesh group key for use when connectivity to the primary root node fails. When the primary root node determines restored connectivity in step 730, the primary root node may send a message in step 735 to the first-hop nodes indicating restored connectivity to trigger migration back to the primary root node. The procedure may illustratively end in step 740 when the primary root node has trigger the first-hop nodes to migrate back to the primary root node.

Figure 8:
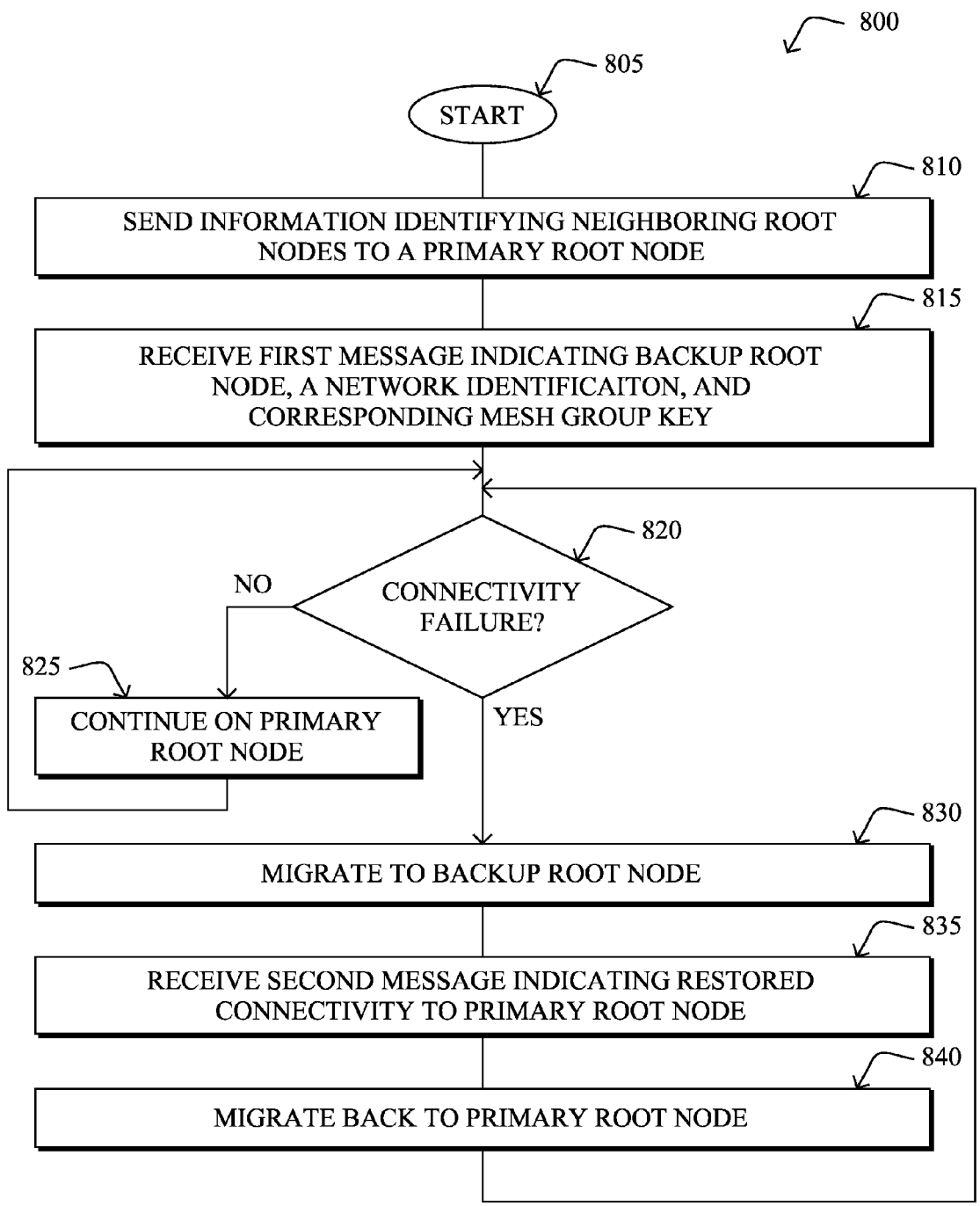
FIG. 8 illustrates an example simplified procedure for migrating to a backup root node after connectivity failure to the primary root node.

In addition, FIG. 8 illustrates an example simplified procedure 800 for migrating to a backup root node after primary root node failure in accordance with one or more embodiments described herein. The procedure 800 may start at step 805, and continues to step 810, where, as described in greater detail above, a first-hop node may send a message to a primary root node identifying one or more neighboring root nodes. In step 815, the first-hop node may receive a first message from the primary root node indicating a backup root node along with a network identification and a corresponding mesh group key associated with the backup root node. As shown in step 820, the first-hop node may determine whether a connectivity to the primary root node has failed. When a connectivity failure to the primary root node has not failed, the first-hop node may continue, in step 825, on the primary root node until a failure is detected. Alternatively, when the first-hop root node detects a connectivity failure to the primary root node, in step 820, the first-hop node may migrate in step 830 to the backup root node, while maintaining a state of a subordinate network, in response to the connectivity failure.

Furthermore, in step 835, the first-hop node may receive a second message from the primary root node indicating restored connectivity to the primary root node. In response to receiving the second message, the first-hop node in step 840 may migrate back to the primary root node. The first-hop node may remain on the primary root node until another is connectivity failure is detected in step 820. Alternatively, the first-hop node may return to sending information to the primary root node in 810 identifying one or more neighboring root nodes and the procedure may continue as described above.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for a backup network topology without (with minimal) service disruption in a shared-media communication network. In particular, the techniques herein dynamically enable a primary root node to select a backup root node based on one or neighboring root nodes detected using information received from first-hop nodes. The techniques may also then trigger migration of the first-hop nodes to the backup root node in a manner that allows the first-hop nodes to "mask" the migration to subordinate nodes, in effect allowing the network to maintain its original state. Therefore, loss of network state information may be prevented when a connectivity failure to the primary root node occurs and reliability of the network may be improved. Said differently, when the first-hop nodes migrate to the backup root node, the subordinate network nodes may maintain the same state without knowledge of the connectivity loss to the primary root node, thus, a routing topology need not be rebuilt after a connectivity failure to the primary root node when network state information is lost. In contrast to current techniques where an alternate root node is selected based on a fixed set of criteria and the entire routing topology migrates to the alternate root node, the techniques herein provide a method of routing only the first-hop nodes to the backup root node to provide optimum performance for a maximum number of nodes.

While there have been shown and described illustrative embodiments that provide is for a backup network topology without service disruption in a shared-media communication network, it is to be understood that various other adaptations and modifications may be made within the spirit and scope of the embodiments herein. For example, the embodiments have been shown and described herein with relation to LLNs and the RPL protocol. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method, comprising:
  detecting, by a primary root node, one or more neighboring root nodes based on information received from first-hop nodes in a shared-media communication network;
  selecting a backup root node from the neighboring root nodes;
  receiving a network identification and a corresponding mesh group key from the backup root node; and
  notifying the first-hop nodes of the backup root node along with the network identification and the corresponding mesh group key to cause the first-hop nodes to migrate to the backup root node when connectivity to the primary root node fails, while maintaining a subordinate state.

2. The method of claim 1, further comprising:
determining restored connectivity of the primary root node; and
sending a message to the first-hop nodes indicating restored connectivity to trigger migration back to the primary root node.

3. The method of claim 1, wherein selecting the backup root node further comprises:
receiving a notification from the first-hop nodes of potential backup root nodes; and
selecting the backup root node based on the potential backup root node received from the most first-hop nodes.

4. The method of claim 1, wherein selecting the backup root node further comprises:
determining a total path cost associated with one or more neighboring root nodes; and
selecting the backup root node based on the determined total path costs.

5. The method of claim 1, wherein selecting the backup root node further comprises:
sending a message to one or more neighboring root nodes to determine resource availability; and
selecting the backup root node based on resource availability.

6. The method of claim 1, further comprising:
sending an instruction to the backup root node to operate as a backup root node; and
receiving an acknowledgment message from the backup root node, wherein notifying the first-hop nodes at the backup root node is in response to the acknowledgement message.

7. The method of claim 1, further comprising:
sending a message to a management node indicating the selected backup root node to cause the management node to send an instruction to the backup root node to operate as a backup root node; and
receiving an acknowledgment message that the backup root node has received the instruction, wherein notifying the first-hop nodes at the backup root node is in response to the acknowledgment message.

8. An apparatus, comprising:
one or more network interfaces to communicate with a shared-media communication network;
a processor coupled to the network interfaces and adapted to execute one or more processes; and
a memory configured to store a process executable by the processor, the process when executed operable to:
detect neighboring root nodes based on information received from first-hop nodes in a shared-media communication network;
select a backup root node from the neighboring root nodes; and
in response to receiving a networking identification and a corresponding mesh group key from the backup root node, notify the first-hop nodes of the backup root node along with the received network identification and the corresponding mesh group key to cause the first-hop nodes to migrate to the backup root node when connectivity to the primary root node fails.

9. The apparatus of claim 8, wherein the process when executed is further operable to:
determine restored connectivity of the primary root node; and
send a message to the first-hop nodes indicating restored connectivity to trigger migration back to the primary root node.

10. The apparatus of claim 8, wherein the process when executed is further operable to:
receive a notification from the first-hop nodes of potential backup root nodes; and
select the backup root node based on the potential backup root node received from the most first-hop nodes.

11. The apparatus of claim 8, wherein the process when executed is further operable to:
determine a path cost associated with one or more neighboring root nodes; and
select the backup root node based on the determined total path costs.

12. The apparatus of claim 8, wherein the process when executed is further operable to:
send a message to one or more neighboring root nodes to determine resource availability; and
select the backup root node based on resource availability.

13. A method, comprising:
sending, by a first hop node, information identifying one or more neighboring root nodes to a primary root node;
receiving a first message from the primary root node indicating a backup root node along with a network identification and a corresponding mesh group key associated with the backup root node;
determining a connectivity failure to the primary root node; and
in response to determining the connectivity failure, migrating to the backup root node, while maintaining a state of a subordinate network.

14. The method of claim 13, further comprising:
receiving a second message from the primary root node indicating restored connectivity to the primary root node; and
in response to receiving the second message, migrating back to the primary root node.

15. The method of claim 13, wherein determining a connectivity failure to the primary root node further comprises:
sending a message to one or more neighboring nodes to test connectivity to primary root node;
detecting a communication failure to the primary root node; and
confirming the communication failure by the one or more neighboring nodes.

16. The method of claim 14, further comprising:
receiving a selection metric regarding the backup root node to cause the migration back to the primary root node.

17. An apparatus, comprising:
one or more network interfaces to communicate with a shared-media communication network;
a processor coupled to the network interfaces and adapted to execute one or more processes; and
a memory configured to store a process executable by the processor, the process when executed operable to:
send information identifying one or more neighboring root nodes to a primary root node;
determine a connectivity failure to the primary root node, in response to receiving a first message from the primary root node indicating a backup root node along with a network identification and a corresponding mesh group key associated with the backup root node; and
migrating to the backup root node while maintaining a state of a subordinate network, in response to determining a connectivity failure,
wherein the apparatus is a first hop node.

18. The apparatus of claim 17, wherein the process when executed is further operable to:

migrate back to the primary root node, in response to receiving a second message from the primary root node indicating restored connectivity to the primary root node.

19. The apparatus of claim 17, wherein the process when executed is operable to:

send a message to one or more neighboring nodes to test connectivity to primary root node;

detect a communication failure to the primary root node; and confirm the communication failure by the one or more neighboring nodes.

20. The apparatus of claim 17, wherein the process when executed is further operable to:

cause migration back to the primary root node, in response to receiving a selection metric regarding the backup root node.

* * * * *